(12) United States Patent
Kwon et al.

(10) Patent No.: US 12,127,254 B2
(45) Date of Patent: Oct. 22, 2024

(54) METHOD AND APPARATUS FOR MULTI-LINK COMMUNICATIONS

(71) Applicant: NXP USA, Inc., Austin, TX (US)

(72) Inventors: Young Hoon Kwon, Laguna Niguel, CA (US); Liwen Chu, San Ramon, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 550 days.

(21) Appl. No.: 17/488,084

(22) Filed: Sep. 28, 2021

(65) Prior Publication Data

US 2022/0104261 A1    Mar. 31, 2022

Related U.S. Application Data

(60) Provisional application No. 63/173,836, filed on Apr. 12, 2021, provisional application No. 63/124,647, filed on Dec. 11, 2020, provisional application No. 63/089,045, filed on Oct. 8, 2020, provisional application No. 63/084,075, filed on Sep. 28, 2020.

(51) Int. Cl.
*H04W 4/00* (2018.01)
*H04W 48/16* (2009.01)
*H04W 74/0816* (2024.01)

(52) U.S. Cl.
CPC ....... *H04W 74/0816* (2013.01); *H04W 48/16* (2013.01)

(58) Field of Classification Search
CPC .......................... H04W 48/16; H04W 74/0816
USPC ...................................................... 370/329
See application file for complete search history.

(56) References Cited

U.S. PATENT DOCUMENTS

| | | | |
|---|---|---|---|
| 2021/0144698 A1 | 5/2021 | Kwon et al. | |
| 2021/0266890 A1* | 8/2021 | Chu | H04W 72/51 |
| 2021/0329500 A1* | 10/2021 | Cariou | H04W 74/002 |
| 2021/0360521 A1* | 11/2021 | Seok | H04W 74/0816 |
| 2021/0377856 A1* | 12/2021 | Chu | H04W 72/0446 |
| 2022/0183062 A1* | 6/2022 | Seok | H04W 28/0278 |
| 2023/0217492 A1* | 7/2023 | Garcia Rodriguez | H04W 74/0816 370/329 |
| 2023/0247668 A1* | 8/2023 | Akhmetov | H04W 88/12 370/329 |

OTHER PUBLICATIONS

Seok, Yongho et al. "Multi-link Spatial Multiplexing", IEEE 802.11-20/0883r0, Jul. 2, 2020, 14 pgs.
Park, Minyoung et al. "Enhanced Multi-Link Single Radio Operation", IEEE 802.11-20/0562r0, 12 pgs.
Seok, Yong Ho et al. "Multi-link Spatial Multiplexing", IEEE 802.11-20/0883r0, Jul. 2020, 14 pgs.
Park, Minyoung et al. "Enhanced Multi-Link Single Radio Operation", IEEE 802.11-20/0562r0, Apr. 21, 2020, 12 pgs.

* cited by examiner

*Primary Examiner* — Temica M Beamer

(57) ABSTRACT

Embodiments of a method and an apparatus for multi-link communications are disclosed. In an embodiment, a method for multi-link communications involves announcing, by a non-access point (non-AP) multi-link device (MLD) to an access point (AP) MLD, a frame exchange restriction in an enhanced multi-link operation, receiving, by the AP MLD from the non-AP MLD, the frame exchange restriction, and transmitting, by the AP MLD to the non-AP MLD, an initial frame according to the frame exchange restriction.

19 Claims, 13 Drawing Sheets

| EHT-MCS MAP (20 MHz-ONLY STA) 402 | EHT-MCS MAP (BW ≤ 80 MHz, EXCEPT 20 MHz-ONLY STA) 404 | EHT-MCS MAP (BW=160 MHz) 406 | EHT-MCS MAP (BW=320 MHz) 408 |
|---|---|---|---|
| 0 OR 4 | 0 OR 3 | 0 OR 3 | 0 OR 3 |

OCTETS:

| FIELD | DEFINITION | ENCODING |
|---|---|---|
| EHT-MCS MAP (20 MHz-ONLY STA) | FOR A 20 MHz-ONLY STA, INDICATES THE MAXIMUM NUMBER OF SPATIAL STREAMS SUPPORTED FOR RECEPTION AND THE MAXIMUM NUMBER OF SPATIAL STREAMS THAT THE STA CAN TRANSMIT, FOR EACH MCS VALUE. | THE FORMAT AND ENCODING OF THIS SUBFIELD ARE DEFINED BY A SUPPORTED EHT-MCS AND NSS SET FIELD FORMAT AND ITS ASSOCIATED DESCRIPTION<br><br>IF B0, B1, AND B3 OF THE SUPPORTED CHANNEL WIDTH SET, IN THE HE PHY CAPABILITIES INFORMATION FIELD ARE ALL 0, THEN THIS FIELD IS PRESENT; OTHERWISE, IT IS NOT PRESENT. |
| EHT-MCS MAP (BW ≤ 80 MHz, EXCEPT 20 MHz-ONLY STA) | IF THE OPERATING CHANNEL WIDTH OF THE STA IS GREATER THAN OR EQUAL TO 80 MHz, INDICATES THE MAXIMUM NUMBER OF SPATIAL STREAMS SUPPORTED FOR RECEPTION AND THE MAXIMUM NUMBER OF SPATIAL STREAMS THAT THE STA CAN TRANSMIT, FOR EACH MCS VALUE, IN A PPDU WITH A BANDWIDTH OF 20, 40 OR 80 MHz. | THE FORMAT AND ENCODING OF THIS SUBFIELD ARE DEFINED BY A SUPPORTED EHT-MCS AND NSS SET FIELD FORMAT AND ITS ASSOCIATED DESCRIPTION<br><br>IF B1 OF THE SUPPORTED CHANNEL WIDTH SET, IN THE HE PHY CAPABILITIES INFORMATION FIELD IS 1, THEN THIS FIELD IS PRESENT; OTHERWISE, IT IS NOT PRESENT. |
| EHT-MCS MAP (BW = 160 MHz) | IF THE OPERATING CHANNEL WIDTH OF THE STA IS GREATER THAN OR EQUAL TO 160 MHz, INDICATES THE MAXIMUM NUMBER OF SPATIAL STREAMS SUPPORTED FOR RECEPTION AND THE MAXIMUM NUMBER OF SPATIAL STREAMS THAT THE STA CAN TRANSMIT, FOR EACH MCS VALUE, IN A PPDU WITH A BANDWIDTH OF 160 MHz. | THE FORMAT AND ENCODING OF THIS SUBFIELD ARE DEFINED BY A SUPPORTED EHT-MCS AND NSS SET FIELD FORMAT AND ITS ASSOCIATED DESCRIPTION<br><br>IF B2 OF THE SUPPORTED CHANNEL WIDTH SET, IN THE HE PHY CAPABILITIES INFORMATION FIELD IS 1, THEN THIS FIELD IS PRESENT; OTHERWISE, IT IS NOT PRESENT. |
| EHT-MCS MAP (BW = 320 MHz) | IF THE OPERATING CHANNEL WIDTH OF THE STA IS 320 MHz, INDICATES THE MAXIMUM NUMBER OF SPATIAL STREAMS SUPPORTED FOR RECEPTION AND THE MAXIMUM NUMBER OF SPATIAL STREAMS THAT THE STA CAN TRANSMIT, FOR EACH MCS VALUE, IN A PPDU WITH A BANDWIDTH OF 320 MHz. | THE FORMAT AND ENCODING OF THIS SUBFIELD ARE DEFINED BY A SUPPORTED EHT-MCS AND NSS SET FIELD FORMAT AND ITS ASSOCIATED DESCRIPTION<br><br>IF THE SUPPORTED FOR 320 MHz IN GHz SUBFIELD, IN THE EHT PHY CAPABILITIES INFORMATION FIELD IS 1, THEN THIS FIELD IS PRESENT; OTHERWISE, IT IS NOT PRESENT. |

FIG. 4B

| B0 | B3 | B4 | B7 | B8 | B11 | B12 | B15 | B16 | B19 | B20 | B23 | B24 | B27 | B28 | B31 |
|---|---|---|---|---|---|---|---|---|---|---|---|---|---|---|---|
| Rx MAX NSS THAT SUPPORTS EHT-MCS 0-7 502-1 | | Tx MAX NSS THAT SUPPORTS EHT-MCS 0-7 502-2 | | Rx MAX NSS THAT SUPPORTS EHT-MCS 8-9 504-1 | | Tx MAX NSS THAT SUPPORTS EHT-MCS 8-9 504-2 | | Rx MAX NSS THAT SUPPORTS EHT-MCS 10-11 506-1 | | Tx MAX NSS THAT SUPPORTS EHT-MCS 10-11 506-2 | | Rx MAX NSS THAT SUPPORTS EHT-MCS 12-13 508-1 | | Tx MAX NSS THAT SUPPORTS EHT-MCS 12-13 508-2 | |
| BITS: | 4 | | 4 | | 4 | | 4 | | 4 | | 4 | | 4 | | 4 |

FIG. 5A

| | B0 B3 | B4 B7 | B8 B11 | B12 B15 | B16 B19 | B20 B23 |
|---|---|---|---|---|---|---|
| | Rx MAX NSS THAT SUPPORTS EHT-MCS 0-9 510-1 | Tx MAX NSS THAT SUPPORTS EHT-MCS 0-9 510-2 | Rx MAX NSS THAT SUPPORTS EHT-MCS 10-11 512-1 | Tx MAX NSS THAT SUPPORTS EHT-MCS 10-11 512-2 | Rx MAX NSS THAT SUPPORTS EHT-MCS 12-13 514-1 | Tx MAX NSS THAT SUPPORTS EHT-MCS 12-13 514-2 |
| BITS: | 4 | 4 | 4 | 4 | 4 | 4 |

FIG. 5B

| MAX NSS THAT SUPPORTS SPECIFIED MCS SET SUBFIELD | THE MAX NSS THAT SUPPORTS THE SPECIFIED MCS SET |
|---|---|
| 0 | NOT SUPPORTED |
| 1 | 1 |
| 2 | 2 |
| 3 | 3 |
| 4 | 4 |
| 5 | 5 |
| 6 | 6 |
| 7 | 7 |
| 8 | 8 |
| 9 | RESERVED |
| 10 | RESERVED |
| 11 | RESERVED |
| 12 | RESERVED |
| 13 | RESERVED |
| 14 | RESERVED |
| 15 | RESERVED |

FIG. 5C

| EHT-MCS MAP (20 MHz-ONLY STA) 608 | EHT-MCS MAP (BW ≤ 80 MHZ, EXCEPT 20 MHz-ONLY STA) 610 | EHT-MCS MAP (BW=160 MHz) 612 | EHT-MCS MAP (BW=320 MHz) 614 |
|---|---|---|---|
| 4 | 3 | 3 | 3 |

OCTETS:

FIG. 6B

METHOD AND APPARATUS FOR MULTI-LINK COMMUNICATIONS

CROSS-REFERENCE TO RELATED APPLICATIONS

This application is entitled to the benefit of U.S. Provisional Patent Application Ser. No. 63/084,075, filed on Sep. 28, 2020, and U.S. Provisional Patent Application Ser. No. 63/089,045, filed on Oct. 8, 2020, and U.S. Provisional Patent Application Ser. No. 63/124,647, filed on Dec. 11, 2020, and U.S. Provisional Patent Application Ser. No. 63/173,836, filed on Apr. 12, 2021, each of which is incorporated by reference herein.

BACKGROUND

In multi-link communications, wireless devices, e.g., access point (AP) multi-link devices (MLDs) or non-AP MLDs, e.g., station (STA) MLDs, can execute various wireless operations, such as coordinate some features or operations for devices in a multi-link operation via one or more links. As an example, frames may be exchanged between an AP MLD and a non-AP MLD to share information corresponding to restrictions and/or capabilities of each MLD. However, because one MLD may not support the capabilities supported by the other MLD, the exchange of frames in multi-link communications may not be easily supported.

SUMMARY

Embodiments of a method and an apparatus for multi-link communications are disclosed. In an embodiment, a method for multi-link communications involves announcing, by a non-access point (non-AP) multi-link device (MLD) to an access point (AP) MLD, a frame exchange restriction in an enhanced multi-link operation, receiving, by the AP MLD from the non-AP MLD, the frame exchange restriction, and transmitting, by the AP MLD to the non-AP MLD, an initial frame according to the frame exchange restriction.

In an embodiment, announcement of the frame exchange restriction involves announcing a reception restriction for the initial frame, where the initial frame is transmitted during a transmission opportunity (TXOP), and a restriction for switching to multi-link monitoring upon expiration of the TXOP.

In an embodiment, when one link of the non-AP MLD is in an awake state, the reception restriction for the initial frame is not implemented during the TXOP, and the restriction for switching to multi-link monitoring is not implemented during the TXOP.

In an embodiment, when more than one link of the non-AP MLD is in an awake state, the reception restriction for the initial frame is implemented during the TXOP, and the restriction for switching to multi-link monitoring is implemented during the TXOP.

In an embodiment, transmitting the initial frame by the AP MLD involves the initial frame indicating at least one of a link switch delay, a link switch delay for multi-link monitoring, a frame type restriction of the initial frame, a number of spatial streams (NSS), and a Physical Layer Convergence Protocol (PLCP) Protocol Data Unit (PPDU) type.

In an embodiment, the link switch delay is not indicated when an AP associated with the AP MLD is a TXOP holder and one link of the non-AP MLD is in an awake state.

In an embodiment, when the link switch delay is not indicated, a first time duration for transmission of another frame by the AP is not considered and instead, the AP uses a second time duration, which is shorter than the first time duration, as a time gap before the transmission.

In an embodiment, when the link switch delay is indicated, a first time duration for transmission of another frame by an AP associated with the AP MLD is considered, and where the AP uses a second time duration, which is longer than the first time duration, as a time gap before the transmission.

In an embodiment, the link switch delay for multi-link monitoring is not indicated when an AP associated with the AP MLD is a TXOP holder and one link of the non-AP MLD is in an awake state.

In an embodiment, the frame type restriction is not indicated when an AP associated with the AP MLD is a TXOP holder and one link of the non-AP MLD is in an awake state.

In an embodiment, when the frame type restriction of the initial frame is not indicated, the AP transmits the initial frame as a Clear to Send (CTS)-to-Self frame to initiate a TXOP.

In an embodiment, when the frame type restriction of the initial frame is indicated, an AP associated with the AP MLD transmits the initial frame as at least one of a multi-user (MU) Request to Send (RTS) (MU-RTS) frame and an RTS frame to initiate a TXOP.

In an embodiment, the NSS is not indicated when an AP associated with the AP MLD is a TXOP holder and one link of the non-AP MLD is in an awake state.

In an embodiment, the PPDU type is not indicated when an AP associated with the AP MLD is a TXOP holder and one link of the non-AP MLD is in an awake state.

In an embodiment, announcement of the frame exchange restriction involves announcing a frame exchange capability for a link after a radio switch to the link during a TXOP.

In an embodiment, announcing the frame exchange capability involves, the non-AP MLD being an enhanced multi-link multi-radio (eMLMR) non-AP MLD that announces its Extremely High Throughput (EHT) Modulation and Coding Scheme (MCS) (EHT-MCS) NSS support.

In an embodiment, the EHT-MCS NSS support includes a 3-octet EHT-MCS Map for bandwidths of no less than 80 MHz, bandwidths of no less than 160 MHz when at least one link supports a 160 MHz bandwidth, and bandwidths of no less than 320 MHz when at least one link supports a 320 MHz bandwidth.

In an embodiment, the eMLMR non-AP MLD does not include a station (STA) that operates only in a 20 MHz bandwidth.

An embodiment of a multi-link communications system is also disclosed. The multi-link communications system includes a non-access point non-AP MLD, where the non-AP MLD includes a processor configured to announce a frame exchange restriction in an enhanced multi-link operation, and an AP MLD, where the AP MLD includes another processor configured to receive, from the non-AP MLD, the frame exchange restriction, and transmit, to the non-AP MLD, an initial frame according to the frame exchange restriction.

An embodiment of an AP MLD is also disclosed. The AP MLD includes a processor configured to receive, from a non-AP MLD, an announcement of a frame exchange restriction in an enhanced multi-link operation, and transmit, to the non-AP MLD, an initial frame according to the frame exchange restriction.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 4A depicts an example of Supported Extremely High Throughput (EHT) Modulation and Coding Scheme (MCS) (EHT-MCS) and number of spatial streams (NSS) Set fields in an element.

FIG. 4B is a table that represents definitions and encoding information for a Supported EHT-MCS and NSS field.

FIG. 5A depicts an example of subfields included in a Supported EHT-MCS and NSS Set field.

FIG. 5B depicts another example of subfields included in a Supported EHT-MCS and NSS Set field.

FIG. 5C is a table that represents encoding information for subfields included in a Supported EHT-MCS and NSS field.

FIG. 6B depicts another example of Supported EHT-MCS and NSS Set fields in an element for an eMLMR operation.

Throughout the description, similar reference numbers may be used to identify similar elements.

DETAILED DESCRIPTION

Figure 1:
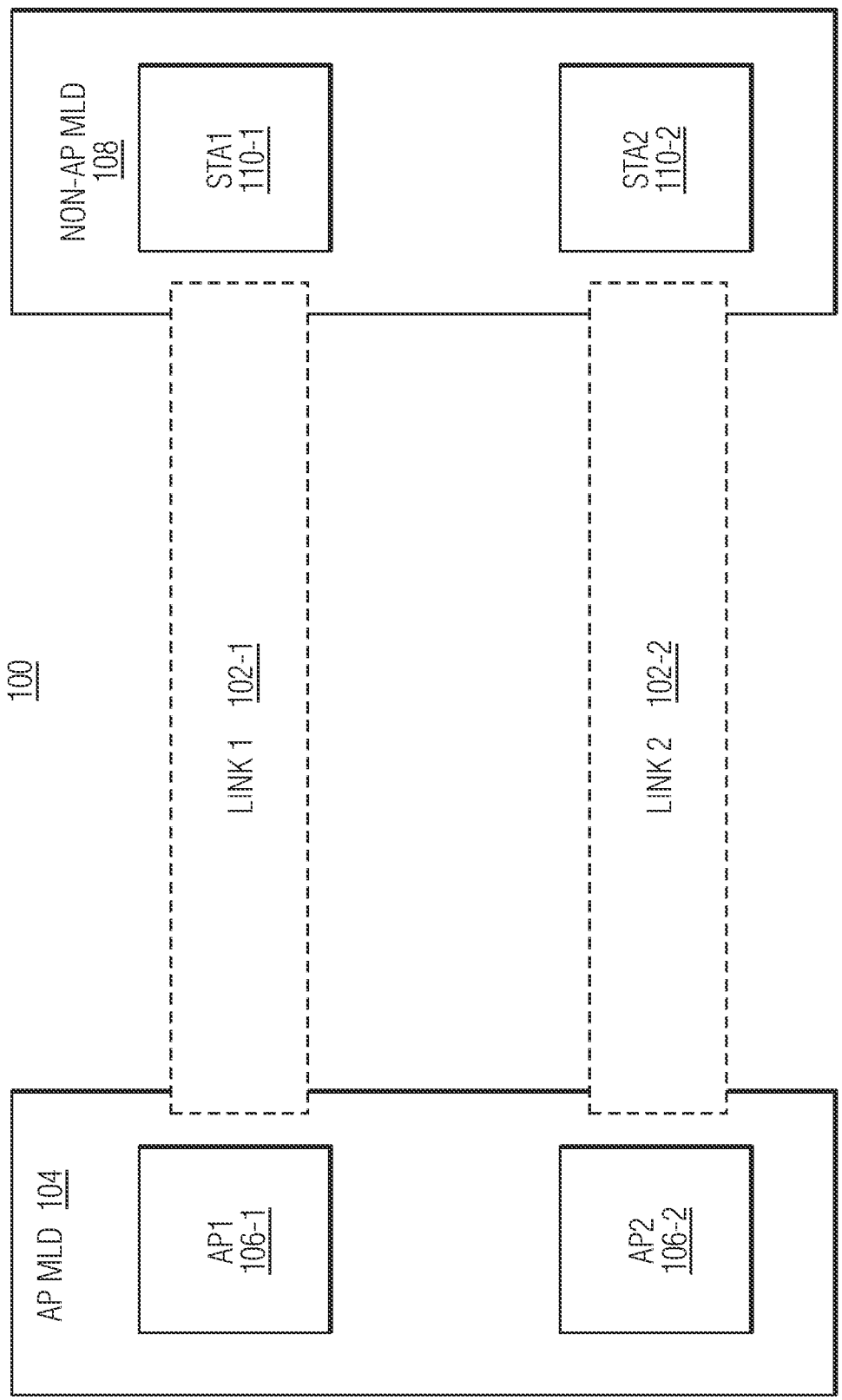
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a multi-link communications system, a wireless device, e.g., an access point (AP) multi-link device (MLD) of a wireless local area network (WLAN) may exchange data with at least one associated non-AP MLD (e.g., a station (STA) MLD). In such an embodiment, the AP MLD may include one or more associated access points (APs) and the non-AP MLD may include one or more associated stations (STAs). The AP MLD may be configured to operate with associated non-AP MLDs according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communications systems operating in accordance with the EHT communication protocol and/or next-generation communication protocols may be referred to herein as "non-legacy" features. In some embodiments of the multi-link communications system described herein, different associated STAs within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., High Efficiency (HE) communication protocol, Very High Throughput (VHT) communication protocol, etc.) may be collectively referred to herein as "legacy" communication protocols.

FIG. 1 depicts a multi-link communications system 100 that is used for wireless (e.g., WiFi) communications. In the embodiment depicted in FIG. 1, the multi-link communications system includes one AP MLD, implemented as AP MLD 104, and one non-AP MLD (e.g., STA MLD), implemented as non-AP MLD 108. The multi-link communications system can be used in various applications, such as industrial applications, medical applications, computer applications, and/or consumer or enterprise applications. In some embodiments, the multi-link communications system may be a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes a single AP MLD with multiple non-AP MLDs, or multiple AP MLDs with more than one non-AP MLD. In another example, although the multi-link communications system is shown in FIG. 1 as being connected in a certain topology, the network topology of the multi-link communications system is not limited to the topology shown in FIG. 1.

In the embodiment depicted in FIG. 1, the AP MLD 104 includes two radios, AP1 106-1 and AP2 106-2. In some embodiments, a common part of the AP MLD 104 implements upper layer Media Access Control (MAC) functionalities (e.g., beacon creation, MLD association establishment, reordering of frames, etc.) and a link specific part of the AP MLD 104, i.e., the APs 106-1 and 106-2, implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 may be wireless APs compatible with at least one WLAN communications protocol (e.g., at least one IEEE 802.11 protocol). For example, the APs 106-1 and 106-2 may be wireless APs compatible with the IEEE 802.11be protocol.

In some embodiments, an AP MLD (e.g., AP MLD 104) connects to a local area network (e.g., a LAN) and/or to a backbone network (e.g., the Internet) through a wired connection and wirelessly connects to wireless STAs, for example, through one or more WLAN communications protocols, such as the IEEE 802.11 protocol. In some embodiments, an AP (e.g., AP1 106-1 and/or AP2 106-2) includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different BSS operating channel. For example, AP1 106-1 may operate in a 320 MHz BSS operating channel at 6 GHz band and AP2 106-2 may operate in a 160 MHz BSS operating channel at 5 GHz band. Although the AP MLD 104 is shown in FIG. 1 as including two APs, other embodiments of the AP MLD 104 may include more than two APs.

In the embodiment depicted in FIG. 1, the non-AP MLD, implemented as non-AP MLD 108, includes two radios (e.g., non-AP STAs), STA1 110-1 and STA2 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the STAs 110-1 and 110-2 are part of the non-AP MLD 108, such that the non-AP MLD may be a communications device that wirelessly connects to a wireless AP MLD. For example, the non-AP MLD 108 may be implemented in a laptop, a desktop personal computer (PC), a mobile phone, or other communications device that supports at least one WLAN communications protocol. In some embodiments, the non-AP MLD 108 is a communications device compatible with at least one IEEE 802.11 protocol (e.g., the IEEE 802.11be protocol). In some embodiments, the non-AP MLD 108 implements a common MAC data service interface and the STAs 110-1 and 110-2 implement a lower layer MAC data service interface.

In some embodiments, the AP MLD 104 and/or the non-AP MLD 108 can identify which communication links support multi-link operation during a multi-link operation setup phase and/or exchanges information regarding multi-link capabilities during the multi-link operation setup phase. In some embodiments, each of the STAs 110-1 and 110-2 of the non-AP MLD 108 may operate in a different frequency band. For example, STA1 110-1 may operate in the 2.4 GHz frequency band and STA2 110-2 may operate in the 5 GHz frequency band. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver.

In the embodiment depicted in FIG. 1, the non-AP MLD 108 communicates with the AP MLD 104 via two communication links, e.g., link 1 102-1 and link 2 102-2. For example, each of the STAs 110-1 or 110-2 communicates with AP1 106-1 or AP2 106-2 via corresponding communication links 102-1 or 102-2. In an embodiment, a communication link (e.g., link 1 102-1 or link 2 102-2) may include a BSS operating channel established by an AP (e.g., AP1 106-1 or AP2 106-2) that features multiple 20 MHz channels used to transmit frames (e.g., Physical Layer Convergence Protocol (PLCP) Protocol Data Units (PPDUs), Beacon frames, management frames, etc.) between an AP MLD and a non-AP MLD. In some embodiments, a 20 MHz channel may be a punctured 20 MHz channel or an unpunctured 20 MHz channel. Although the non-AP MLD 108 is shown in FIG. 1 as including two STAs, other embodiments of the non-AP MLD 108 may include one STA or more than two STAs. In addition, although the AP MLD 104 communicates (e.g., wirelessly communicates) with the non-AP MLD 108 via multiple links 102-1 and 102-2, in other embodiments, the AP MLD 104 may communicate (e.g., wirelessly communicate) with the non-AP MLD 108 via more than two communication links or less than two communication links.

In some embodiments, a non-AP MLD may be a multi-link single-radio non-AP MLD. As an example, a multi-link single-radio non-AP MLD may be defined as a non-AP MLD that supports operation on more than one link but exchanges (e.g., receives and/or transmits) frames on one link at a time. In addition, a non-AP MLD (e.g., multi-link single-radio non-AP MLD) may operate according to an enhanced multi-link single-radio (eMLSR) operation. Non- AP MLDs that operate according to the eMLSR operation are able to exchange (e.g., transmit and receive) data frames and/or management frames with another MLD (e.g., AP MLD) on one link at a time and are also able to listen on one or more links. As an example, "listening" may include performing a Clear Channel Assessment (CCA) and/or receiving initial frames (e.g., Request to Send (RTS) frames or multi-user (MU) RTS (MU-RTS) frames). Once an initial frame is received on one link, a radio may be switched to the link that the initial frame was received on for frame exchange sequences within a transmission opportunity (TXOP) initiated by the initial frame. As described herein, a "TXOP" may be defined as a period that may include one or more frame exchange sequences in which MLDs may transmit and/or receive frames. Additionally, a TXOP may include a "TXOP holder", which may be an AP of an AP MLD, an AP MLD, a STA of a non-AP MLD, or non-AP MLD that initiates a TXOP.

In some embodiments, a non-AP MLD can be a multi-link multi-radio MLD that supports an enhanced multi-link multi-radio (eMLMR) operation (e.g., an eMLMR MLD). In such an embodiment, the eMLMR MLD may monitor multiple links. Additionally, in such an embodiment, once an initial frame of a TXOP is received on a link from an associated AP MLD (e.g., an AP of the associated AP MLD), radios of other links may switch to the link that the initial frame was received on for frame exchange sequences during the TXOP.

In some embodiments, initial frames may include one or more limitations (e.g., frame exchange restrictions) for a frame exchange sequence between an AP MLD and a non-AP MLD. As described herein, a "frame exchange sequence" may be described as occurring within a period (e.g., TXOP) in which a soliciting frame and a solicited frame are transmitted and/or received between two communications devices. As an example, an "initial frame exchange sequence" may involve transmitting an initial frame that solicits a following frame and receiving, in response to the initial frame, the following frame. A frame exchange restriction may include a number of spatial streams (NSS), a Modulation and Coding Scheme (MCS) (e.g., data rate), a PPDU type, a frame type restriction, a link switch delay for multi-link monitoring, and/or a link switch delay. As an example, the frame exchange restriction may be announced by a non-AP MLD to an AP MLD in an enhanced multi-link operation. As described herein, an "enhanced multi-link operation" may be an eMLSR operation or an eMLMR operation depending on whether an MLD (e.g., AP MLD or non-AP MLD) is a multi-link single-radio MLD that supports the eMLSR operation (e.g., eMLSR MLD), or a multi-link multi-radio MLD that supports the eMLMR operation (e.g., eMLMR MLD). In such an example, if a non-AP MLD indicates a maximum NSS that the non-AP MLD is capable of transmitting/receiving at a time, then each STA of the non-AP MLD that is operating using a link that is included in a specified set of links will support the indicated maximum NSS.

When a non-AP MLD performs an enhanced multi-link operation (e.g., eMLSR operation or eMLMR operation), the non-AP MLD is able to listen on a set of links and is able to indicate its link switch delay to an AP MLD. The AP MLD may then initiate a TXOP with the non-AP MLD on one link (included in a set of links between the AP MLD and the non-AP MLD) by transmitting an initial frame to the non-AP MLD. In an embodiment, the initial frame solicits a response frame (e.g., a Clear to Send (CTS) frame) from the non-AP MLD. After the non-AP MLD receives the initial frame, the non-AP MLD can then exchange (e.g., transmit and/or receive) frames on the link where the initial frame was received until the end of the TXOP. Once the TXOP ends, the non-AP MLD then switches back to "listening" on the set of links between the non-AP MLD and the AP MLD.

During a TXOP after an initial frame exchange sequence, the non-AP MLD may be subject to receiving frames with a specified NSS, such that the specified NSS may be announced by the non-AP MLD to the AP MLD during a multi-link association (e.g., prior to transmission of the initial frame by the AP MLD). In addition, the non-AP MLD may be subject to its spatial stream capabilities, operation mode, and/or link switch delay when receiving a PPDU that is sent using more than one spatial stream Short Interframe Space (SIFS) after the initial frame exchange sequence of the TXOP.

For a non-AP MLD to perform an enhanced multi-link operation, the non-AP MLD may need to switch its Radio Frequency (RF) chains to operate on a link that is included in a set of links in less than a first time (e.g., T1) after receiving an initial frame from an AP MLD on the link. As an example, the first time may be indicated to the AP MLD as part of the non-AP MLD's capabilities, or the first time may be a value that is determined by a standard (e.g., the EHT communication protocol, the HE communication protocol, etc.).

However, some non-AP MLDs may need more time (e.g., more than the first time (T1)) to switch their RF chains amongst the set of links. If the necessary time becomes longer, then the AP MLD may need to add padding to the initial frame so that the non-AP MLD has sufficient time to switch its RF chains. Consequently, adding padding to the initial frame may cause the overall system throughput to decrease because padding does not include meaningful information. In addition, for the enhanced multi-link operation, the AP MLD may need to initiate a frame exchange sequence with a predetermined initial frame, such that in some operations, exchanging an initial frame may not be beneficial to TXOP protection. Therefore, when non-AP MLDs need more time to switch their RF chains, the enhanced multi-link operation may not be beneficial. For these non-AP MLDs, it may be advantageous to operate as a regular single-radio MLD. By identifying whether a non-AP MLD needs more time to switch its RF chains amongst a set of links, multi-link communication systems may be able to improve performance and efficiency in wireless communications.

In accordance with an embodiment of the invention, a technique for multi-link communications involves announcing, by a non-AP MLD to an AP MLD, a frame exchange restriction in an enhanced multi-link operation, receiving, by the AP MLD from the non-AP MLD, the frame exchange restriction, and transmitting, by the AP MLD to the non-AP MLD, an initial frame according to the frame exchange restriction. In such an embodiment, announcement of the frame exchange restriction may involve announcing a reception restriction for the initial frame during a TXOP, and a restriction for switching to multi-link monitoring upon expiration of the TXOP. In addition, transmitting the initial frame may involve indicating a link switch delay, a link switch delay for multi-link monitoring, a frame type restriction of the initial frame, an NSS, and/or a PPDU type during the TXOP. By implementing the reception restriction, the restriction for switching to multi-link monitoring, and the indications of the initial frame, the AP MLD and the non-AP MLD are able to exchange data more efficiently by using a higher NSS for frame exchange sequences (except an initial frame exchange sequence) during the TXOP. Thus, improving the data exchange capabilities between the AP MLD and the non-AP MLD can increase overall performance and efficiency in multi-link communication systems.

In an embodiment, when a non-AP MLD performs an enhanced multi-link operation and the non-AP MLD is in an awake state on more than one link (included in a set of links between the non-AP MLD and an AP MLD), a link switch delay may be considered when the AP MLD transmits an initial frame of a frame exchange sequence (and TXOP) with the non-AP MLD. As an example, the awake state may involve a non-AP MLD having a STA in active mode, such that the STA in active mode is considered to be in the awake state. In such an embodiment, when one link of the non-AP MLD is in the awake state, a reception restriction for the initial frame may not be implemented during a TXOP and the restriction for switching to multi-link monitoring may not be implemented during the TXOP.

In another embodiment, when a non-AP MLD performs an enhanced multi-link operation and the non-AP MLD is in an awake state on one link (included in a set of links between the non-AP MLD and an AP MLD), a link switch delay may not be considered, and the AP MLD may initiate a frame exchange sequence (and TXOP) with the non-AP MLD based on a baseline IEEE 802.11 operation. In such an embodiment, when more than one link of the non-AP MLD is in the awake state, a reception restriction for the initial frame may be implemented during a TXOP and the restriction for switching to multi-link monitoring may be implemented during the TXOP.

In some embodiments, a first time duration may be indicated by a non-AP MLD to an AP MLD in an enhanced multi-link operation. If the non-AP MLD is in an awake state on more than one link where the enhanced multi-link operation is performed, then the first time duration is considered when an AP of the AP MLD generates and transmits an initial frame that initiates a frame exchange sequence (and TXOP) with a STA of the non-AP MLD on a first link. Alternatively, if the non-AP MLD is in an awake state on one link where the enhanced multi-link operation is performed, then the AP of the AP MLD generates and transmits the initial frame without considering the first time duration.

When the first time duration is considered (e.g., when the non-AP MLD is in an awake state on more than one link) in generating the initial frame, padding may be added at the end of the initial frame. As an example, the padding allows for a second time duration between the end of the initial frame (before padding) and the start of a following frame (e.g., solicited response frame, data frame, etc.) to be longer than the first time duration. By implementing a second time duration that is longer than the first time duration, the non-AP MLD and the AP MLD can allow for an amount of time that is adequate for link switching. As an example, the following frame may be transmitted by an AP of the AP MLD or a STA of the non-AP MLD. In one embodiment, the STA may send another frame between the initial frame and the following frame.

Examples of frame exchange sequences between an AP MLD and a non-AP MLD in an enhanced multi-link operation are described in further detail below with reference to FIGS. 2A-2B and FIGS. 3A-3B.

Figure 2A:
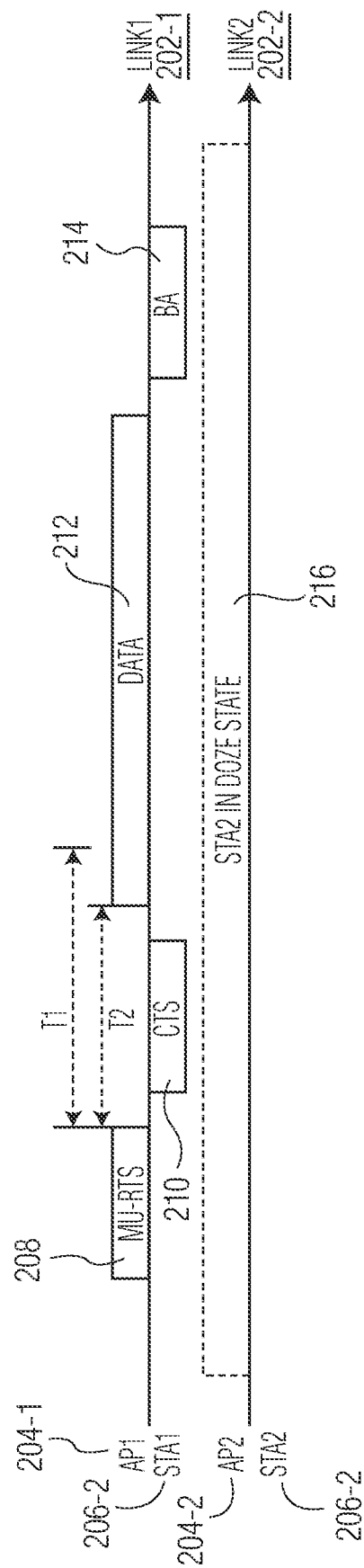
FIG. 2A illustrates an example of frame exchange sequences when one link of a non-Access Point (non-AP) multi-link device (MLD) is in an awake state.

FIG. 2A illustrates an example of frame exchange sequences when one link of a non-AP MLD is in an awake state. In an embodiment, an AP MLD (not shown) with two affiliated APs, AP1 204-1 and AP2 204-2, operate on Link1 202-1 and Link2 202-2, respectively. In addition, a non-AP MLD (not shown) with two affiliated STAs, STA1 206-1 and STA2 206-2, associates with the APs of the AP MLD on Link1 202-1 and Link2 202-2, respectively. In some embodiments, the non-AP MLD may announce a frame exchange restriction to the AP MLD prior to the frame exchange sequences between the AP MLD and the non-AP MLD (e.g., during a multi-link association). As an example, the frame exchange restriction may be implemented in an enhanced multi-link operation. If the AP MLD receives a frame exchange restriction from the non-AP MLD, then the AP MLD may initiate the frame exchange sequences with the non-AP MLD by transmitting an initial frame according to the frame exchange restriction.

In an embodiment, the frame exchange sequences (and TXOP) begin when AP1 204-1 transmits an initial frame, MU-RTS frame 208, on Link1 202-1 to STA1 206-1. The MU-RTS frame 208 transmitted by AP1 204-1 solicits a following frame, CTS frame 210, from STA1 206-1 on Link1 202-1 and begins (at the end of the MU-RTS frame 208) a time gap for a link switching delay. In the embodiment shown by FIG. 2A, the AP-MLD received, from the non-AP MLD, an announcement (prior to the frame exchange sequences) that includes a frame exchange restriction indicating that the non-AP MLD needs a first time duration (shown by T1) for the link switching delay. However, because the non-AP MLD is in an awake state on Link1 202-1 (only) and STA2 206-2 is in a doze state 216 on Link2 202-2, there is no need for the link switching delay. Thus, T1 is not considered and the MU-RTS frame 208 does not include padding. Instead, a second time duration (shown by T2) is used for the time gap.

Once STA1 206-1 has successfully received the MU-RTS frame 208, STA1 206-1 transmits the CTS frame 210 to AP1 204-1 on Link1 202-1 during T2. After the second time duration T2 expires, AP1 204-1 transmits a data frame 212 to STA1 206-1 on Link1 202-1. When STA1 206-1 receives the data frame 212, STA1 then transmits a Block Acknowledgement (Ack) (BA) frame 214 to AP1 204-1. In some embodiments, the frame exchange sequences (and TXOP) may end after the BA frame 214 is received by AP1 204-1. In such an embodiment, the frame exchange sequences between the AP MLD and the non-AP MLD may be in accordance with a baseline IEEE 802.11 operation, such that there may be no additional limitations considered.

Figure 2B:
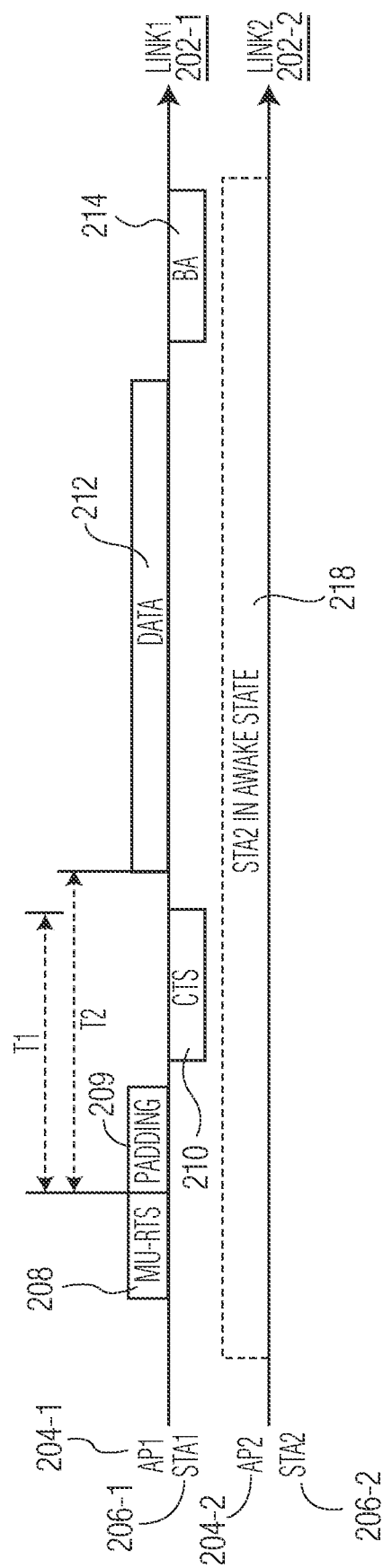
FIG. 2B illustrates an example of frame exchange sequences when more than one link of a non-AP MLD is in an awake state.

FIG. 2B illustrates an example of frame exchange sequences when more than one link of a non-AP MLD is in an awake state. In an embodiment, an AP MLD (not shown) includes AP1 204-1 and AP2 204-2, and a non-AP MLD (not shown) includes STA1 206-1 and STA2 206-2, such that each AP and STA operates on Link1 202-1 or Link2 202-2 as described with reference to FIG. 2A.

In an embodiment, the frame exchange sequences (and TXOP) begin when AP1 204-1 transmits an initial frame, MU-RTS frame 208, on Link1 202-1 to STA1 206-1. In such an embodiment, the MU-RTS frame 208 includes padding 209. Additionally, the MU-RTS frame 208 transmitted by AP1 204-1 solicits a following frame, CTS frame 210, from STA1 206-1 on Link1 202-1 and begins (at the end of the MU-RTS frame 208) a time gap for a link switching delay. In the embodiment shown by FIG. 2B, the AP-MLD received, from the non-AP MLD, an announcement (prior to the frame exchange sequences) that includes a frame exchange restriction indicating that the non-AP MLD needs a first time duration (shown by T1) for the link switching delay. Because the non-AP MLD is in an awake state on Link1 202-1 and STA2 206-2 is in an awake state 218 on Link2 202-2, there is a need for the link switching delay. Thus, T1 is considered and the MU-RTS frame 208 includes the padding 209 so that a second time duration (shown by T2) is used for the time gap. In an embodiment, because T2 is longer than T1, there is an adequate amount of time for link switching by the non-AP MLD.

Once STA1 206-1 has successfully received the MU-RTS frame 208 that includes the padding 209, STA1 206-1 transmits the CTS frame 210 to AP1 204-1 on Link1 202-1 during T2. After the second time duration T2 expires, AP1 204-1 transmits a data frame 212 to STA1 206-1 on Link1 202-1. When STA1 206-1 receives the data frame 212, STA1 then transmits a BA frame 214 to AP1 204-1. In some embodiments, the frame exchange sequences (and TXOP) may end after the BA frame 214 is received by AP1 204-1. In such an embodiment, the frame exchange sequences between the AP MLD and the non-AP MLD may also include additional limitations to a baseline IEEE 802.11 operation.

With reference to FIG. 2A and FIG. 2B, the additional limitations may include the initial frame (e.g., MU-RTS 208) being limited to a Control frame or specific frame(s) of a Control frame type. As an example, the specific frame(s) of the control frame type may include an RTS frame, a modified version of an MU-RTS frame, a Buffer Status Report Poll (BSRP) frame, a Bandwidth Query Report Poll (BQRP) frame, etc. The additional limitations may also include an NSS for the initial frame being limited to a number up to N, such that N may be an integer greater than zero. Furthermore, the additional limitations may include an MCS and/or data rate of the initial frame being limited up to X (e.g., X may be a 24 Mbps rate or other rate) and/or a PPDU type of the PPDU carrying the initial frame being limited to, e.g., a non-High Throughput (non-HT) (duplicate) PPDU, HE PPDU, etc.

Figure 3A:
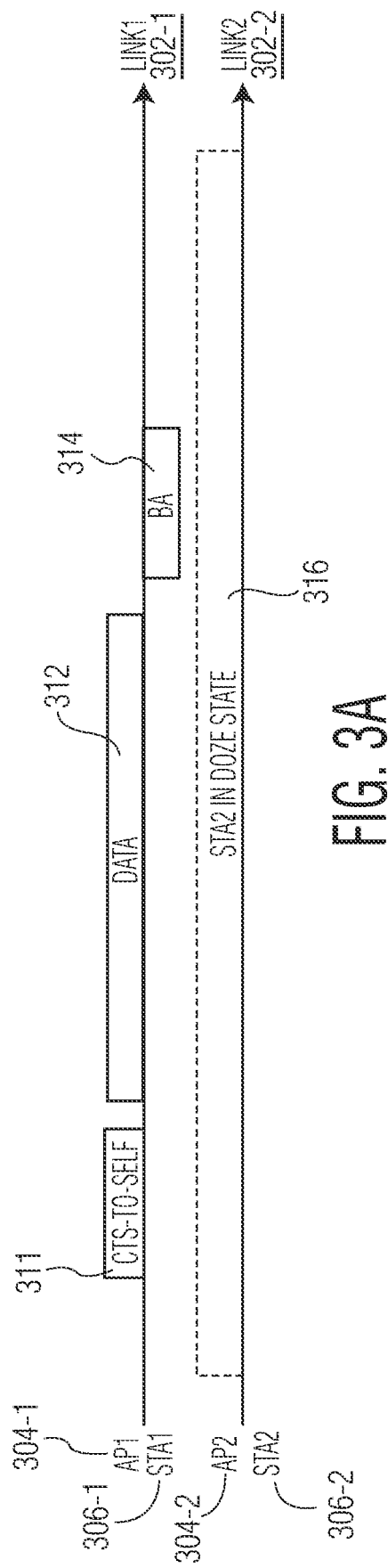
FIG. 3A illustrates another example of frame exchange sequences when one link of a non-AP MLD is in an awake state.

FIG. 3A illustrates another example of frame exchange sequences when one link of a non-AP MLD is in an awake state. In an embodiment, an AP MLD (not shown) includes AP1 304-1 and AP2 304-2, and a non-AP MLD (not shown) includes STA1 306-1 and STA2 306-2, such that each AP and STA operates on Link1 302-1 or Link2 302-2 as described with reference to FIG. 2A.

In the embodiment shown by FIG. 3A, the AP-MLD received, from the non-AP MLD, an announcement (prior to the frame exchange sequences) that includes a frame exchange restriction indicating an initial frame has a limitation. For example, the limitation may be that only an RTS frame and/or an MU-RTS frame is allowed, that an NSS is limited to 1, and/or that a data rate may be limited up to 24 Mbps. However, because the non-AP MLD is in an awake state on Link1 302-1 (only) and STA2 306-2 is in a doze state 316 on Link2 302-2, there is no need for the initial frame to have the limitation(s).

In an embodiment, AP1 304-1 initiates the frame exchange sequences (and TXOP) by transmitting an initial frame, CTS-to-self frame 311, on Link1 302-1 to STA1 306-1. After transmitting the CTS-to-self frame 311, AP1 304-1 then transmits a data frame 312 to STA1 306-1 on Link1 302-1. When STA1 306-1 receives the data frame 312, STA1 306-1 then transmits a BA frame 314 to AP1 304-1. In some embodiments, the frame exchange sequences (and TXOP) may end after the BA frame 314 is received by AP1 304-1. In some embodiments, AP1 304-1 can transmit another frame to the non-AP MLD after the end of the frame exchange sequences in accordance with a baseline IEEE 802.11 operation, such that a limitation on the first time duration T1 may not be applied.

Figure 3B:
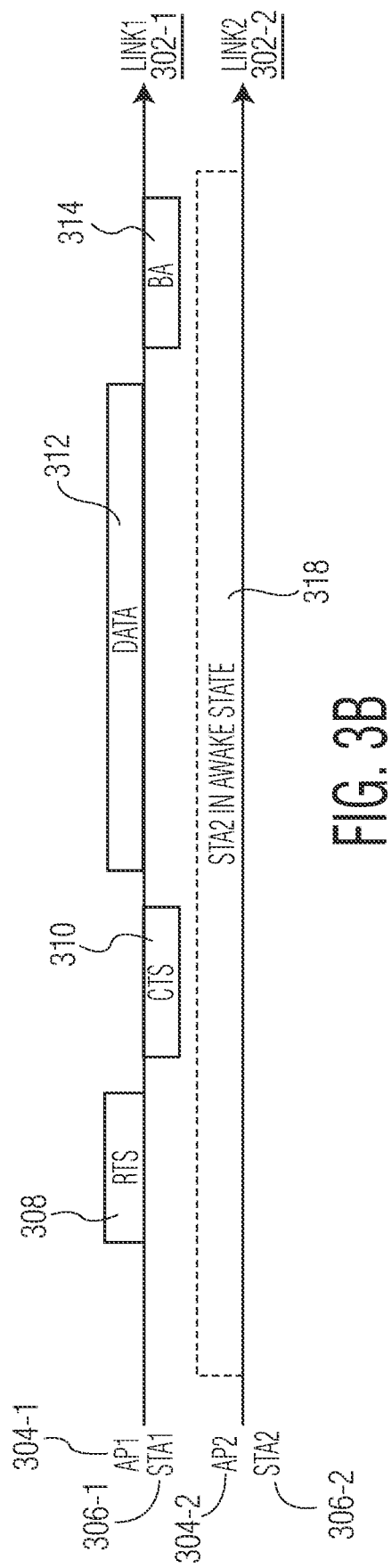
FIG. 3B illustrates another example of frame exchange sequences when more than one link of a non-AP MLD is in an awake state.

FIG. 3B illustrates another example of frame exchange sequences when more than one link of a non-AP MLD is in an awake state. In an embodiment, an AP MLD (not shown) includes AP1 304-1 and AP2 304-2, and a non-AP MLD (not shown) includes STA1 306-1 and STA2 306-2, such that each AP and STA operates on Link1 302-1 or Link2 302-2 as described with reference to FIG. 2A.

In the embodiment shown by FIG. 3B, the AP-MLD received, from the non-AP MLD, an announcement (prior to the frame exchange sequences) that includes a frame exchange restriction indicating an initial frame has a limitation. For example, the limitation may be that only an RTS frame and/or an MU-RTS frame is allowed, that an NSS is limited to 1, and/or that a data rate may be limited up to 24 Mbps. Because the non-AP MLD is in an awake state on Link1 302-1 and STA2 306-2 is in an awake state 318 on Link2 302-2, there is a need for the initial frame to have the limitation(s).

In an embodiment, AP1 304-1 initiates the frame exchange sequences (and TXOP) by transmitting an initial frame, RTS frame 308, on Link1 302-1 to STA1 306-1. In such an embodiment, the RTS frame 308 transmitted by AP1 304-1 solicits a following frame, CTS frame 310, from STA1 306-1 on Link1 302-1. In addition, because the non-AP MLD announced the frame exchange restriction indicating that the initial frame has the limitation, the RTS frame 308 has an NSS of one and a data rate of 24 Mbps. Once STA1 306-1 has successfully received the RTS frame 308, STA1 306-1 transmits the CTS frame 310 to AP1 304-1 on Link1 302-1. In response to the CTS frame 310, AP1 304-1 transmits a data frame 312 to STA1 306-1 on Link1 302-1. When STA1 306-1 receives the data frame 312, STA1 306-1 then transmits a BA frame 314 to AP1 304-1. In some embodiments, the frame exchange sequences (and TXOP) may end after the BA frame 314 is received by AP1 304-1. In some embodiments, AP1 304-1 cannot transmit another frame to the non-AP MLD after the end of the frame exchange sequences for another time gap equal to the first time duration T1.

With reference to FIGS. 3A and 3B, the other time gap after the frame exchange sequences may be the first time duration T1 for the link switching delay. In an embodiment, the non-AP MLD may announce its capabilities for the first time duration when the non-AP associates with an AP MLD, e.g., prior to the frame exchange sequences (and TXOP). At the end of the frame exchange sequences, if the non-AP MLD switches its operation link from a first link (e.g., Link1 302-1) to a second link (e.g., Link2 302-2), then the non-AP MLD may not transmit a frame on the second link until the non-AP MLD identifies that the second link is idle. In such embodiments, a baseline IEEE 802.11 operation may imply an IEEE 802.11 operation for a baseline single-radio MLD operation.

In some embodiments, the non-AP MLD may announce a frame exchange restriction in an enhanced multi-link operation for frame exchange sequences following an initial frame exchange sequence via Supported EHT-MCS and NSS Set fields. For example, the frame exchange restriction may be an NSS that the non-AP MLD is able to transmit and/or receive and may be defined by the Supported EHT-MCS and NSS Set fields and subfields of a Supported EHT-MCS and NSS Set field.

Examples of Supported EHT-MCS and NSS Set fields and subfields of a Supported EHT-MCS and NSS Set field are described in further detail with reference to FIGS. 4A-4B, FIGS. 5A-5C, and FIGS. 6A-6B.

FIG. 4A depicts an example of Supported EHT-MCS and NSS Set fields in an element. In an embodiment, the Supported EHT-MCS and NSS Set fields may be included in an element of a management frame transmitted by a STA of a non-AP MLD. The embodiment of FIG. 4A is shown as including four fields, implemented as a first field 402, a second field 404, a third field 406, and a fourth field 408. In an embodiment, the first field 402 is zero or four octets and includes an EHT-MCS Map for STAs that have a bandwidth (sometimes referred to herein as "BW") of 20 MHz (e.g., 20 MHz-only STAs), the second field 404 is zero or three octets and includes an EHT-MCS Map for STAs that have a bandwidth of at most 80 MHz (excludes STAs that have a bandwidth of 20 MHz), the third field 406 is zero or three octets and includes an EHT-MCS Map for STAs that have a bandwidth of 160 MHz, and the fourth field 408 is zero or three octets and includes an EHT-MCS Map for STAs that have a bandwidth of 320 MHz. In one embodiment, the EHT-MCS Map for STAs that have a bandwidth of X (e.g., X may be 80 MHz, 160 MHz, or 320 MHz) may include the EHT-MCS Map for STAs that have a bandwidth less than X. In an embodiment, the Supported EHT-MCS and NSS Set fields indicate combinations of EHT-MCS 0-13 and an NSS that a STA associated with a non-AP MLD supports for transmission and reception of frames exchanged with an AP MLD. In such an embodiment, EHT-MCS 14 and 15 may only be combined with a single stream.

FIG. 4B is a table, 400, that represents definitions and encoding information for a Supported EHT-MCS and NSS field. In particular, the table 400 shown in FIG. 4B includes three columns, implemented as a first column (shown by "Field"), a second column (shown by "Definition"), and a third column (shown by "Encoding"). In an embodiment, the table 400 represents definitions and encoding information for the first field 402, the second field 404, the third field 406, and the fourth field 408 of the Supported EHT-MCS and NSS field as described with reference to FIG. 4A. In such an embodiment, the table 400 defines what each field included in the Supported EHT-MCS and NSS field represents and how each field is encoded. Although each field may be represented by the information included in table 400, the fields are not limited to such information and may be further defined by a communication protocol (e.g., the EHT communication protocol).

FIG. 5A depicts an example of subfields included in a Supported EHT-MCS and NSS Set field. The embodiment of FIG. 5A is shown as including eight subfields, a first subfield 502-1, a second subfield 502-2, a third subfield 504-1, a fourth subfield 504-2, a fifth subfield 506-1, a sixth subfield 506-2, a seventh subfield 508-1, and an eighth subfield 508-2. In an embodiment, the subfields may be included in a Supported EHT-MCS and NSS Set field (e.g., the first field 402). For example, the subfields may be implemented in an EHT-MCS Map for STAs that have a bandwidth of 20 MHz (only).

In an embodiment, the first subfield 502-1 is four bits (bits B0 to B3) and includes a receiving (Rx) max NSS that supports EHT-MCS 0-7, the second subfield 502-2 is four bits (bits B4 to B7) and includes a transmitting (Tx) max NSS that supports EHT-MCS 0-7, the third subfield 504-1 is four bits (bits B8 to B11) and includes a Rx max NSS that supports EHT-MCS 8-9, the fourth subfield 504-2 is four bits (bits B12 to B15) and includes a Tx max NSS that supports EHT-MCS 8-9, the fifth subfield 506-1 is four bits (bits B16 to B19) and includes a Rx max NSS that supports EHT-MCS 10-11, the sixth subfield 506-2 is four bits (bits B20 to B23) and includes a Tx max NSS that supports EHT-MCS 10-11, the seventh subfield 508-1 is four bits (bits B24 to B27) and includes a Rx max NSS that supports EHT-MCS 12-13, and the eighth subfield 508-2 is four bits (bits B28 to B31) and includes a Tx max NSS that supports EHT-MCS 12-13.

FIG. 5B depicts another example of subfields included in a Supported EHT-MCS and NSS Set field. The embodiment of FIG. 5B is shown as including six subfields, a first subfield 510-1, a second subfield 510-2, a third subfield 512-1, a fourth subfield 512-2, a fifth subfield 514-1, and a sixth subfield 514-2. In an embodiment, the subfields may be included in a Supported EHT-MCS and NSS Set field (e.g., the second field 404, the third field 406, and/or the fourth field 408). For example, the subfields may be implemented in an EHT-MCS Map for STAs that have a bandwidth of at most 80 MHz (excludes STAs that have a bandwidth of 20 MHz), 160 MHz, and/or 320 MHz.

In an embodiment, the first subfield 510-1 is four bits (bits B0 to B3) and includes a Rx max NSS that supports EHT-MCS 0-9, the second subfield 510-2 is four bits (bits B4 to B7) and includes a Tx max NSS that supports EHT-MCS 0-9, the third subfield 512-1 is four bits (bits B8 to B11) and includes a Rx max NSS that supports EHT-MCS 10-11, the fourth subfield 512-2 is four bits (bits B12 to B15) and includes a Tx max NSS that supports EHT-MCS 10-11, the fifth subfield 514-1 is four bits (bits B16 to B19) and includes a Rx max NSS that supports EHT-MCS 12-13, and the sixth subfield 514-2 is four bits (bits B20 to B23) and includes a Tx max NSS that supports EHT-MCS 12-13.

FIG. 5C is a table, 500, that represents encoding information for subfields included in a Supported EHT-MCS and NSS field. In particular, the table 500 shown in FIG. 5C includes two columns, implemented as a first column (shown by "Max NSS that supports specified MCS Set subfield") and a second column (shown by "The max NSS that supports the specified MCS Set"). In an embodiment, the table 500 represents encoding information for a (Rx or Tx) Max NSS that Supports EHT-MCS XXX (e.g., XXX represents 0-7, 0-9, 8-9, 10-11, or 12-13) for the subfields of the Supported EHT-MCS and NSS field as described with reference to FIG. 5A and FIG. 5B. In such an embodiment, a value that is reserved in the table indicates a max NSS of greater than eight spatial streams.

In an embodiment, for a subfield with Rx Max NSS that Supports EHT-MCS XXX, the max Rx NSS is equal to the smaller of (i) the value of a Rx Max NSS that Supports Specified MCS subfield for a given EHT-MCS, and (ii) a maximum supported NSS as indicated by the value of an Rx NSS field of an Operating Mode (OM) Notification frame (if the value of an Rx NSS Type is 0) or of an OM Control subfield. In an embodiment, for a subfield with Tx Max NSS that Supports EHT-MCS XXX, the max Tx NSS is equal to the smaller of (i) the value of a Tx Max NSS that Supports Specified MCS subfield for a given EHT-MCS, and (ii) a maximum supported NSS as indicated by the value of an Rx NSS field of an OM Control subfield transmitted by a non-AP STA of a non-AP MLD.

Although each subfield may be represented by the information included in table 500, the subfields are not limited to such information and may be further defined by a communication protocol (e.g., the EHT communication protocol).

The EHT communication protocol may also define an eMLMR operation for MLDs (e.g., AP MLDs and/or non-AP MLDs). According to the eMLMR operation, a non-AP MLD may operate according to an eMLMR mode on a specified set of enabled links between the non-AP MLD and an associated AP MLD. As an example, the specified set of enables links may be defined as links which support eMLMR and may sometimes be referred to herein as "eMLMR links".

In an embodiment, an MLD with dot11EHTEMLMROptionImplemented equal to true may set an eMLMR Support subfield of a To Be Determined (TBD) Capabilities element (which indicates MLD level capabilities) to one, otherwise, the MLD may set the eMLMR Support subfield to zero. In another embodiment, a non-AP MLD with dot11EHTEMLMROptionImplemented equal to true may set an eMLMR Rx NSS subfield of a TBD element to dot11SupportedEMLMRRxNSS and an eMLMR Tx NSS subfield of a TBD element to dot11SupportedEMLMRTxNSS (which indicate MLD level capabilities). In some embodiments, a non-AP MLD with dot11EHTEMLMROptionImplemented equal to true may operate in an eMLMR mode via TBD signaling. In some embodiments, a non-AP MLD with dot11EHTEMLMROptionImplemented equal to true may indicate its link switch delay via a TBD management frame.

In an embodiment, when a non-AP MLD operates in the eMLMR mode, after an initial frame exchange sequence subject to its per-link spatial stream capabilities and operating mode on one of its eMLMR links, the non-AP MLD may be able to support features described herein until the end of a TXOP initiated by the initial frame exchange sequence. In such an embodiment, the non-AP MLD may receive PPDUs with an NSS up to a value indicated by an eMLMR Rx NSS subfield of a TBD element at a time on the link for which the initial frame exchange sequence was made. Additionally, in such an embodiment, the non-AP MLD may transmit PPDUs with a number of space time streams (NSTS) up to a value indicated by an eMLMR Tx NSS subfield of a TBD element at a time on the link for which the initial frame exchange sequence was made. After the end of the TXOP, each STA of the non-AP MLD in the eMLMR mode may be able to transmit or receive PPDUs subject to the STA's per-link spatial stream capabilities, operating mode, and any link switching delay indicated by the non-AP MLD.

For a non-AP MLD operating according to an eMLMR operation, the non-AP MLD may need to indicate its supported eMLMR Rx NSS and/or Tx NSS, which is an MLD level capability to an AP MLD associated with the non-AP MLD. Supported eMLMR Rx/Tx NSS information may be delivered in a Common Info field of a Multi-Link (ML) element that uses a similar format as a Supported EHT-MCS and NSS Set field defined in an EHT Capabilities element. Consequently, when compared to the Supported EHT-MCS and NSS Set field in the EHT Capabilities element (which indicates supported Rx/Tx NSS information for a given bandwidth and/or MCS of a STA), eMLMR Rx/Tx NSS information may have several differences described herein. For example, the eMLMR Rx/Tx NSS information may be MLD level information, different links may have different bandwidths, and different STAs operating on different links may have different capabilities, e.g., a STA affiliated with an MLD on a first link may be a 20 MHz-only STA while another STA affiliated with the MLD on a second link may support a 320 MHz bandwidth. Therefore, the same field format of the Supported EHT-MCS and NSS Set field may not be reused for eMLMR Rx/Tx NSS information.

In an embodiment, for a current Supported EHT-MCS and NSS Set field, a 20 MHz-only STA may have a different EHT-MCS Map than other STAs. In such an embodiment, 4 octets are used for the 20 MHz-only STA and 3 octets are used for STAs with other bandwidths that are greater than 20 MHz. Therefore, if an MLD (e.g., non-AP MLD) includes a 20 MHz-only STA and a non-20 MHz-only STA, indication of the EHT-MCS Map for eMLMR Rx/Tx NSS information is unclear. Techniques for indicating EHT-MCS Maps for eMLMR Rx/Tx NSS information are described herein.

In some embodiments, eMLMR operations may not allow a 20 MHz-only STA. As an example, if a non-AP MLD includes a first STA (e.g., STA1) that is a 20 MHz-only STA and a second STA (e.g., STA2) that supports a 320 MHz bandwidth, and STA1 and STA2 are operating on Link1 and Link2, respectively, then Link1 may not be an eMLMR link.

In some embodiments, if a STA that is affiliated with an MLD and operating on an eMLMR link is a 20 MHz-only STA, then other STAs that are affiliated with the MLD and operating on other eMLMR links may be (or may operate as) 20 MHz-only STAs for eMLMR operations. For example, if an MLD supports an eMLMR operation and the MLD includes a 20 MHz-only STA, the other STAs included in the MLD may be (or may operate as 20 MHz-only STAs for the eMLMR operation. In another embodiment, if a STA that is affiliated with an MLD and operating on an eMLMR link is a 20 MHz-only STA, the eMLMR operation may be limited to a 20 MHz bandwidth (only). As an example, if a non-AP MLD includes a first STA (e.g., STA1) that is a 20 MHz-only STA and a second STA (e.g., STA2) that supports a 320 MHz bandwidth, and STA1 and STA2 are operating on Link1 and Link2 (Link1 and Link2 are eMLMR links), respectively, then STA2 will operate as a 20 MHz-only STA.

In some embodiments, if a STA that is affiliated with an MLD and operating on an eMLMR link is a 20 MHz-only STA, then an EHT-MCS Map may be based on a 20 MHz-only STA's format for bandwidths that are greater than 20 MHz. For example, 4 octets may be used for an EHT-MCS Map for bandwidths of at most 80 MHz and 3 octets may be used for an EHT-MCS Map for bandwidths greater than 80 MHz. Such an example is described in further detail with reference to FIG. 6A.

Figure 6A:
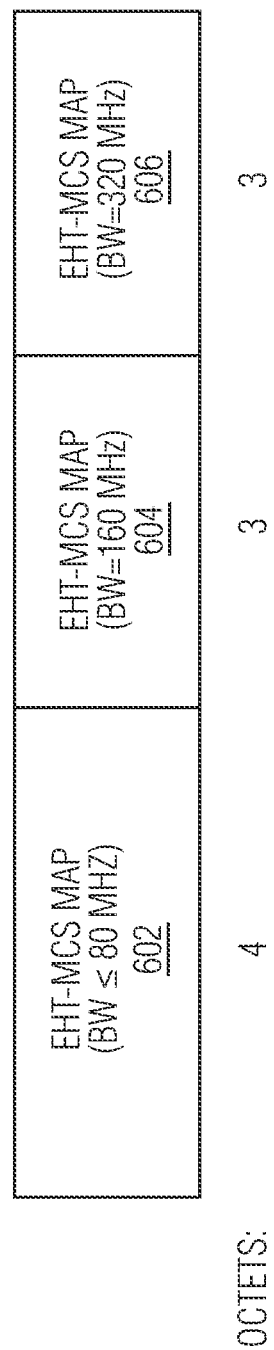
FIG. 6A depicts an example of Supported EHT-MCS and NSS Set fields in an element for an enhanced multi-link multi-radio (eMLMR) operation.

FIG. 6A depicts an example of Supported EHT-MCS and NSS Set fields in an element for an eMLMR operation. In an embodiment, the Supported EHT-MCS and NSS Set fields may be included in an element of a management frame transmitted and/or received by a STA of a non-AP MLD operating according to an eMLMR operation. The embodiment of FIG. 6A is shown as including three fields, a first field 602, a second field 604, and a third field 606. In an embodiment, the first field 602 is four octets and includes an EHT-MCS Map for STAs that have a bandwidth of at most 80 MHz, the second field 604 is three octets and includes an EHT-MCS Map for STAs that have a bandwidth of 160 MHz, and the third field 606 is three octets and includes an EHT-MCS Map for STAs that have a bandwidth of 320 MHz.

With reference to FIG. 6A, as an example, if a non-AP MLD includes a first STA (e.g., STA1) that is a 20 MHz-only STA and a second STA (e.g., STA2) that supports a 320 MHz bandwidth, and STA1 and STA2 are operating on Link1 and Link2, respectively, then the field used by Link2 depends on the bandwidth of Link2. In such an example, if Link2 has a bandwidth of at most 80 MHz, then an EHT-MCS Map for 20 MHz-only STA format is used (e.g., the first field 602). Alternatively, in such an example, if Link2 has a bandwidth of more than 80 MHz, then an EHT-MCS Map for non-20 MHz-only STA format is used (e.g., the second field 604 and/or the third field 606).

In some embodiments, if the eMLMR operation is implemented on a link that corresponds to a 20 MHz-only STA, then a separate EHT-MCS Map may be indicated. For example, eMLMR links may include both 20 MHz-only STAs and non-20 MHz-only STAs, such that an EHT-MCS Map for 20 MHz-only STAs and non-20 MHz-only STAs are both included. Such an example is described in further detail with reference to FIG. 6B.

FIG. 6B depicts another example of Supported EHT-MCS and NSS Set fields in an element for an eMLMR operation. In an embodiment, the Supported EHT-MCS and NSS Set fields may be included in an element of a management frame transmitted and/or received by a STA of a non-AP MLD operating according to an eMLMR operation. The embodiment of FIG. 6B is shown as including four fields, a first field 608, a second field 610, a third field 612, and a fourth field 614. In an embodiment, the first field 608 is four octets and includes an EHT-MCS Map for STAs that have a bandwidth of 20 MHz (e.g., 20 MHz-only STAs), the second field 610 is three octets and includes an EHT-MCS Map for STAs that have a bandwidth of at most 80 MHz (excludes STAs that have a bandwidth of 20 MHz), the third field 612 is three octets and includes an EHT-MCS Map for STAs that have a bandwidth of 160 MHz, and the fourth field 614 is three octets and includes an EHT-MCS Map for STAs that have a bandwidth of 320 MHz.

With reference to FIG. 6B, as an example, if a non-AP MLD includes a first STA (e.g., STA1) that is a 20 MHz-only STA and a second STA (e.g., STA2) that supports a 320 MHz bandwidth, and STA1 and STA2 are operating on Link1 and Link2, respectively, then on Link1, an EHT-MCS Map for 20 MHz-only STA format is used (e.g., the first field 608), and on Link2, an EHT-MCS Map for non-20 MHz-only STA format is used (e.g., the second field 610, the third field 612, and/or the fourth field 614).

In some embodiments, if a supported bandwidth of each link included in a set of eMLMR links is different, indication of which bandwidth is being used for eMLMR Rx/Tx NSS information is unclear. Techniques for indicating bandwidths being used for eMLMR Rx/Tx NSS information are described herein.

In some embodiments, a bandwidth on which eMLMR Rx/Tx NSS information is being carried may be explicitly indicated. In such an embodiment, actual operating bandwidth of an eMLMR operation may be subject to a supported bandwidth of a link that an initial frame for a TXOP is transmitted on. As an example, if a non-AP MLD includes three STAs, STA1, STA2, and STA3, that operate on Link1, Link2, and Link3, and support bandwidths of 40 MHz, 160 MHz, and 320 MHz, respectively, then there may be a separate bandwidth indication subfield that indicates that a Supported EHT-MCS and NSS Set subfield for eMLMR Rx/Tx NSS information includes an EHT-MCS Map for a bandwidth of at most 80 MHz, a bandwidth of 160 MHz, and a bandwidth of 320 MHz.

In some embodiments, eMLMR Rx/Tx NSS information may be indicated as a bandwidth that is the maximum bandwidth of eMLMR links. In such an embodiment, actual operating bandwidth of an eMLMR operation may be the maximum bandwidth of the eMLMR links. As an example, if a non-AP MLD includes three STAs, STA1, STA2, and STA3, that operate on Link1, Link2, and Link3, and support bandwidths of 40 MHz, 160 MHz, and 320 MHz, respectively, then because the maximum bandwidth supported is 320 MHz, a Supported EHT-MCS and NSS Set subfield for eMLMR Rx/Tx NSS information includes an EHT-MCS Map for a bandwidth of at most 80 MHz, a bandwidth of 160 MHz, and a bandwidth of 320 MHz.

In some embodiments, eMLMR Rx/Tx NSS information may be indicated as a bandwidth that is the minimum bandwidth of eMLMR links. In such an embodiment, actual operating bandwidth of an eMLMR operation may be limited to the minimum bandwidth of the eMLMR links. As an example, if a non-AP MLD includes three STAs, STA1, STA2, and STA3, that operate on Link1, Link2, and Link3, and support bandwidths of 40 MHz, 160 MHz, and 320 MHz, respectively, then because the minimum bandwidth supported is 40 MHz, a Supported EHT-MCS and NSS Set subfield for eMLMR Rx/Tx NSS information includes an EHT-MCS Map for a bandwidth of at most 80 MHz only.

In some embodiments, a Common Info field of Basic variant ML elements may include fields as described herein.

In some embodiments, if a link included in a set of eMLMR links corresponds to a 20 MHz-only STA, then links included in the set of eMLMR links will correspond to 20 MHz-only STAs. In such an embodiment, a first subfield indicating a supported bandwidth of an eMLMR operation may include states for bandwidths of 20 MHz, 80 MHz, 160 MHz, and 320 MHz. For example, a 20 MHz state includes an EHT-MCS Map (4 octets) for 20 MHz-only STA, an 80 MHz state includes an EHT-MCS Map (3 octets) for STAs that have a bandwidth of at most 80 MHz (excludes STAs that have a bandwidth of 20 MHz), a 160 MHz state includes an EHT-MCS Map (3 octets) for STAs that have a bandwidth of at most 80 MHz (excludes STAs that have a bandwidth of 20 MHz) and an EHT-MCS Map (3 octets) for STAs that have a bandwidth of 160 MHz, and a 320 MHz state includes an EHT-MCS Map (3 octets) for STAs that have a bandwidth of at most 80 MHz (excludes STAs that have a bandwidth of 20 MHz), an EHT-MCS Map (3 octets) for STAs that have a bandwidth of 160 MHz, and an EHT-MCS Map (3 octets) for STAs that have a bandwidth of 320 MHz.

In some embodiments, a first subfield may indicate supported bandwidth for an eMLMR operation, e.g., zero corresponds to bandwidths of at most 80 MHz, one corresponds to a bandwidth of 160 MHz, and two corresponds to a bandwidth of 320 MHz. In such an embodiment, a second subfield may indicate if an EHT-MCS Map for a bandwidth of at most 80 MHz is encoded using a 20 MHz-only STA's map (4 octets) or not (3 octets), e.g., zero corresponds to three octets and one corresponds to four octets. In some embodiments, the first subfield and the second subfield can be combined together as a third subfield, e.g., zero for a bandwidth of at most 80 MHz (3 Octets), one for a bandwidth of at most 80 MHz with a 20 MHz-only STA's Map (4 Octets), two for a bandwidth of 160 MHz (3 Octets+3 Octets), three for a bandwidth of 160 MHz with a 20 MHz-only STA's Map (4 Octets+3 Octets), four for a bandwidth of 320 MHz (3 Octets+3 Octets+3 Octets), and five for a bandwidth of 320 MHz with a 20 MHz-only STA's Map (4 Octets+3 Octets+3 Octets). Furthermore, in such an embodiment, if the second subfield indicates that an EHT-MCS Map for a bandwidth of at most 80 MHz is encoded using a 20 MHz-only STA's map (4 octets), then the EHT-MCS Map for a bandwidth of at most 80 MHz is encoded using the 20 MHz-only STA's map (4 octets) regardless of the first subfield value, and EHT-MCS Maps for bandwidths of 160 MHz and 320 MHz are encoded using a baseline map (3 octets).

In some embodiments, if a link included in a set of eMLMR links corresponds to a 20 MHz-only STA, then links included in the set of eMLMR links will correspond to a 20 MHz-only STA. In such an embodiment, an AP MLD may identify a supported bandwidth for the set of eMLMR links associated with a non-AP MLD based on EHT Capabilities of each STA affiliated with the non-AP MLD. As an example, if each STA affiliated with the non-AP MLD on the set of eMLMR links is a 20 MHz-only STA, then an EHT-MCS Map (4 octets) for a 20 MHz-only STA may be included in the identification. As another example, if each STA affiliated with the non-AP MLD on the set of eMLMR links is not a 20 MHz-only STA, then the maximum bandwidth of an eMLMR operation may be in accordance with one of the embodiments described herein.

In one embodiment, if the maximum bandwidth is 80 MHz, then an EHT-MCS Map (3 octets) for STAs with a bandwidth of at most 80 MHz (excludes 20 MHz-only STAs) may be included in the identification. In another embodiment, if the maximum bandwidth is 160 MHz, then an EHT-MCS Map (3 octets) for STAs that have a bandwidth of at most 80 MHz (excludes 20 MHz-only STAs) and an EHT-MCS Map (3 octets) for STAs that have a bandwidth of 160 MHz may be included in the identification. In yet another embodiment, if the maximum bandwidth is 320 MHz, then an EHT-MCS Map (3 octets) for STAs that have a bandwidth of 160 MHz, and a 320 MHz state includes an EHT-MCS Map (3 octets) for STAs that have a bandwidth of at most 80 MHz (excludes STAs that have a bandwidth of 20 MHz), an EHT-MCS Map (3 octets) for STAs that have a bandwidth of 160 MHz, and an EHT-MCS Map (3 octets) for STAs that have a bandwidth of 320 MHz.

Figure 7:
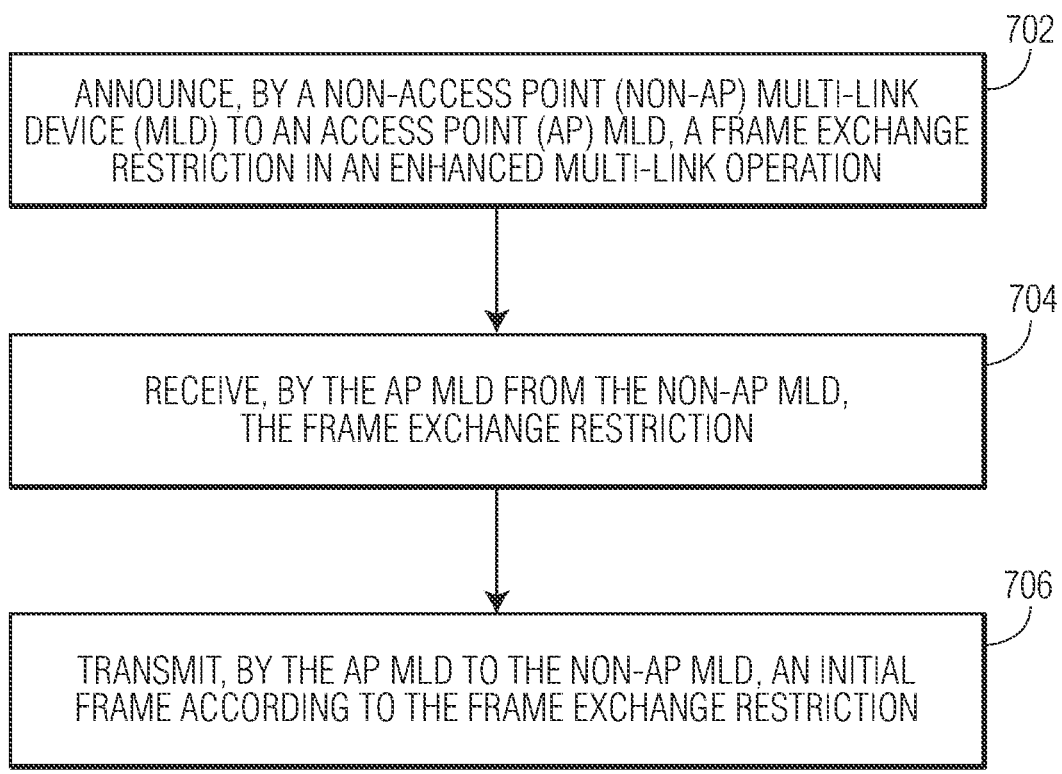
FIG. 7 illustrates a flow diagram of a technique for multi-link communications in accordance with an embodiment of the invention.

FIG. 7 illustrates a flow diagram of a technique for multi-link communications in accordance with an embodiment of the invention. At block 702, a non-AP MLD announces to an AP MLD, a frame exchange restriction in an enhanced multi-link operation. At block 704, the AP MLD receives from the non-AP MLD, the frame exchange restriction. At block 706, the AP MLD transmits to the non-AP MLD, an initial frame according to the frame exchange restriction.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for multi-link communications, the method comprising:
   announcing, by a non-access point (non-AP) multi-link device (MLD) to an access point (AP) MLD, a frame exchange restriction in an enhanced multi-link operation;
   receiving, by the AP MLD from the non-AP MLD, the frame exchange restriction; and
   transmitting, by the AP MLD to the non-AP MLD, an initial frame according to the frame exchange restriction;
   wherein announcement of the frame exchange restriction involves announcing:
   a reception restriction for the initial frame, wherein the initial frame is transmitted during a transmission opportunity (TXOP); and
   a restriction for switching to multi-link monitoring upon expiration of the TXOP.

2. The method of claim 1, wherein when one link of the non-AP MLD is in an awake state:
   the reception restriction for the initial frame is not implemented during the TXOP; and
   the restriction for switching to multi-link monitoring is not implemented during the TXOP.

3. The method of claim 1, wherein when more than one link of the non-AP MLD is in an awake state:
   the reception restriction for the initial frame is implemented during the TXOP; and
   the restriction for switching to multi-link monitoring is implemented during the TXOP.

4. The method of claim 1, wherein transmitting the initial frame by the AP MLD involves the initial frame indicating at least one of:
   a link switch delay;
   a link switch delay for multi-link monitoring;
   a frame type restriction of the initial frame;
   a number of spatial streams (NSS); and
   a Physical Layer Convergence Protocol (PLCP) Protocol Data Unit (PPDU) type.

5. The method of claim 4, wherein the link switch delay is not indicated when an AP associated with the AP MLD is a TXOP holder and one link of the non-AP MLD is in an awake state.

6. The method of claim 5, wherein when the link switch delay is not indicated, a first time duration for transmission of another frame by the AP is not considered and instead, the AP uses a second time duration, which is shorter than the first time duration, as a time gap before the transmission.

7. The method of claim 4, wherein when the link switch delay is indicated, a first time duration for transmission of another frame by an AP associated with the AP MLD is considered, and wherein the AP uses a second time duration, which is longer than the first time duration, as a time gap before the transmission.

8. The method of claim 4, wherein the link switch delay for multi-link monitoring is not indicated when an AP associated with the AP MLD is a TXOP holder and one link of the non-AP MLD is in an awake state.

9. The method of claim 4, wherein the frame type restriction is not indicated when an AP associated with the AP MLD is a TXOP holder and one link of the non-AP MLD is in an awake state.

10. The method of claim 9, wherein when the frame type restriction of the initial frame is not indicated, the AP transmits the initial frame as a Clear to Send (CTS)-to-Self frame to initiate a TXOP.

11. The method of claim 4, wherein when the frame type restriction of the initial frame is indicated, an AP associated with the AP MLD transmits the initial frame as at least one of a multi-user (MU) Request to Send (RTS) (MU-RTS) frame and an RTS frame to initiate a TXOP.

12. The method of claim 4, wherein the NSS is not indicated when an AP associated with the AP MLD is a TXOP holder and one link of the non-AP MLD is in an awake state.

13. The method of claim 4, wherein the PPDU type is not indicated when an AP associated with the AP MLD is a TXOP holder and one link of the non-AP MLD is in an awake state.

14. The method of claim 1, wherein announcement of the frame exchange restriction involves announcing a frame exchange capability for a link after a radio switch to the link during a TXOP.

15. The method of claim 14, wherein announcing the frame exchange capability involves:
the non-AP MLD being an enhanced multi-link multi-radio (eMLMR) non-AP MLD that announces its Extremely High Throughput (EHT) Modulation and Coding Scheme (MCS) (EHT-MCS) NSS support.

16. The method of claim 15, wherein the EHT-MCS NSS support includes a 3-octet EHT-MCS Map for:
bandwidths of no less than 80 MHz;
bandwidths of no less than 160 MHz when at least one link supports a 160 MHz bandwidth; and
bandwidths of no less than 320 MHz when at least one link supports a 320 MHz bandwidth.

17. The method of claim 15, wherein the eMLMR non-AP MLD does not include a station (STA) that operates only in a 20 MHz bandwidth.

18. A multi-link communications system, the multi-link communications system comprising:
a non-access point (non-AP) multi-link device (MLD), wherein the non-AP MLD includes a processor configured to:
announce a frame exchange restriction in an enhanced multi-link operation; and
an access point (AP) MLD, wherein the AP MLD includes another processor configured to:
receive, from the non-AP MLD, the frame exchange restriction; and
transmit, to the non-AP MLD, an initial frame according to the frame exchange restriction;
wherein announcement of the frame exchange restriction involves announcing:
a reception restriction for the initial frame, wherein the initial frame is transmitted during a transmission opportunity (TXOP); and
a restriction for switching to multi-link monitoring upon expiration of the TXOP.

19. An access point (AP) multi-link device (MLD), the AP MLD comprising a processor configured to:
receive, from a non-access point (non-AP) MLD, an announcement of a frame exchange restriction in an enhanced multi-link operation; and
transmit, to the non-AP MLD, an initial frame according to the frame exchange restriction;
wherein the announcement includes a reception restriction for the initial frame, wherein the initial frame is transmitted during a transmission opportunity (TXOP), and a restriction for switching to multi-link monitoring upon expiration of the TXOP.

* * * * *